No. 750,905. Patented February 2, 1904.

UNITED STATES PATENT OFFICE.

JAMES THOMAS SOUTH, OF BRIGHTON, ENGLAND.

ARTIFICIAL SLATE.

SPECIFICATION forming part of Letters Patent No. 750,905, dated February 2, 1904.

Application filed April 20, 1903. Serial No. 153,570. (No specimens.)

*To all whom it may concern:*

Be it known that I, JAMES THOMAS SOUTH, a subject of the King of England, residing at Sarnia House, Grantham Road, Preston Park, Brighton, in the county of Sussex, England, have invented certain new and useful Improvements in Artificial Slate; and I do hereby declare the following to be a full, clear, and exact description of the invention, such as will enable others skilled in the art to which it appertains to make and use the same.

This invention relates to an improved composition for the manufacture of artificial slate suitable for use as a substitute for quarried slate for roofing-slates, writing-slates, mantelpieces, clock-cases, and many other purposes.

According to this invention I make a mixture of, first, Portland cement; second, ferric oxid, commonly called "red oxid of iron;" third, blue-black, a substance obtained by a combination of dried sprays of the vine-tree or ground birchwood with tannic acid, gallic acid, ferrous sulfate, and anilin-blue; fourth, permanganate of potash; fifth, coloring-matter to suit requirements, according to the nature of the article for which the artificial slate is to be utilized.

The following is an example of proportions that I have found answer well in practice; but I wish it to be understood that I do not confine myself to such proportions: Portland cement, one ton; ferric oxid or red oxid of iron, two pounds; blue-black, one-half hundred-weight; permanganate of potash, one pound; coloring-matter to suit requirements.

The ingredients are reduced to a plastic state with water and placed in a mold in layers to a suitable thickness, according to the article to be produced. They are then left to set for a few days. The substance is then removed from the molds and stacked and left to mature, a process which usually occupies a period of about three months. The process of maturing is aided by occasionally drenching the articles with cold water, the frequency of such drenchings depending upon the dampness of the weather.

Although the composition of the four ingredients with the addition of coloring-matter, as before described, gives the best results for general purposes, in some cases I find it desirable to make mixtures consisting of cement, ferric oxid, and blue-black or cement, ferric oxid, and permanganate of potash or cement, blue-black, and permanganate of potash, any of these mixtures being used with the addition of a suitable amount of coloring-matter.

The use of oxid of iron according to this invention hardens the cement, and the combination of blue-black and the alkali produces close molecular cohesion, thereby giving great strength and toughness and reducing the porosity of the finished article.

What I claim, and desire to secure by Letters Patent of the United States of America, is—

1. A composition for the manufacture of artificial slate consisting of a mixture of Portland cement, with red oxid of iron, blue-black and permanganate of potash, substantially as described.

2. A composition for the manufacture of artificial slate consisting of a mixture of Portland cement, with red oxid of iron and blue-black, substantially as described.

3. A composition for the manufacture of artificial slate consisting of a mixture of Portland cement with blue-black and permanganate of potash, substantially as described.

4. A composition for the manufacture of artificial slate, consisting of a mixture of Portland cement, with red oxid of iron and permanganate of potash, substantially as described.

5. A composition for the manufacture of artificial slate, consisting of a mixture of Portland cement, red oxid of iron, blue-black, permanganate of potash and coloring-matter, substantially as described.

In testimony whereof I affix my signature in presence of two witnesses.

JAMES THOMAS SOUTH.

Witnesses:
ARTHUR MORAINS,
WALTER THOMAS WALKER.